United States Patent [19]

Shinholster, Jr. et al.

[11] 4,369,054

[45] Jan. 18, 1983

[54] FIBER/SLAG COMPOSITION

[76] Inventors: Leavie J. Shinholster, Jr., Rte. #4, Box 172, Northport, Ala. 35476; Charles H. Tully-Wilkins, 277 Woodland Hills, Tuscaloosa, Ala. 35405

[21] Appl. No.: 963,732

[22] Filed: Nov. 27, 1978

Related U.S. Application Data

[63] Continuation-in-part of Ser. No. 878,807, Feb. 17, 1978, abandoned.

[51] Int. Cl.³ ............... C05F 11/00; A01C 1/00; C10L 5/40; D21H 3/66
[52] U.S. Cl. ............... 71/25; 44/16 R; 44/20; 44/21; 47/9; 47/56; 47/58; 47/73; 47/74; 47/DIG. 4; 47/DIG. 9; 47/DIG. 11; 71/64.13; 71/903; 71/904; 106/117; 162/141; 162/154; 162/181.1; 162/182.6

[58] Field of Search ............... 106/117, 51, 50, 98, 106/86, 99, 97; 44/16 R, 20, 21; 47/9, 56, 58, 73, 74, DIG. 4, DIG. 9, DIG. 11; 71/23, 24, 25, 64.13, 903, 904; 162/181 R, 181 C, 181 D, 141, 154, 231; 501/28, 36

[56] References Cited

U.S. PATENT DOCUMENTS

| | | | |
|---|---|---|---|
| 1,628,807 | 5/1927 | Roberts, Jr. | 106/117 |
| 1,978,102 | 10/1934 | Clapp | 47/DIG. 9 |
| 2,243,857 | 6/1941 | Fischer | 47/DIG. 9 |
| 3,017,720 | 1/1962 | Busch | 47/58 |
| 3,096,188 | 7/1963 | Maydl | 106/117 |
| 3,110,583 | 11/1963 | Richardson | 47/DIG. 4 |
| 3,125,294 | 3/1964 | Lill | 47/DIG. 9 |
| 3,269,824 | 8/1966 | Aswell | 71/25 |
| 3,298,822 | 1/1967 | Arvay et al. | 106/51 |
| 3,779,860 | 12/1973 | Oshida et al. | 162/181 R |
| 3,923,535 | 12/1975 | Zilberman et al. | 106/117 |
| 4,146,402 | 3/1979 | Kira et al. | 106/117 |

*Primary Examiner*—Mark Bell
*Attorney, Agent, or Firm*—Oblon, Fisher, Spivak, McClelland & Maier

[57] ABSTRACT

A composition comprising an admixture of pulped fibers and a slag characterized by an open pore structure.

22 Claims, No Drawings

FIBER/SLAG COMPOSITION

CROSS REFERENCE TO RELATED APPLICATIONS

This application is a continuation-in-part application of application Ser. No. 878,807, which was filed on Feb. 17, 1978, now abandoned.

BACKGROUND OF THE INVENTION

1. Field of the Invention

This invention relates to a process and the products produced thereby for the reuse of scrap material which at the present time has little or no commercial value.

2. Description of the Prior Art

In recent years it has become apparent that it is necessary for man to recycle and reuse materials which he had previously simply discarded as trash. It has also become necessary in recent years, both from environmental and economic considerations, to find uses for many of the waste products produced by our industrial processes. One of the largest single by-products produced by industry is the slag which is formed in the refining of ores and metals and in the burning of carbonaceous fuels. The steel industry has long recognized that it would be desirable to find a use for the many millions of tons of slag which it generates every year. Toward this end, it has been suggested that slag can be used as railroad ballast, in the manufacture of cement, as fill, as aggregate for roads, as aggregate for cement products, in roofing material and the like. While the steel industry is able to dispose of many tons of slag each year for such uses, the percentage of slag which is placed into commercial application is very small when compared to the total quantity of slag produced. A familar sight around any steel mill is the huge slag dump.

The ore refining industry is not the only one who has waste products and by-products for which there is little or no commercial use. The paper industry has long recycled paper for use in the manufacture of new paper to the greatest extent possible. However, each reuse of the paper results in a breakdown of the fibers which make up the paper and ultimately when the fibers become too short, it cannot be reused. At the present time it is not possible to reuse newsprint in the manufacture of new paper except to a very limited extent. Typically, newsprint is disposed of either by burning or by its use in sanitary landfills. One comparatively recent use for newsprint is in the manufacture of insulation for homes and offices. However, the quantity of newsprint which is consumed by this use is extremely small and its use has recently come under severe criticism because of the safety hazards involved in the use of highly flammable cellulose products as insulation.

Other industries such as the forestry industry, rubber industry and coal mining industry have similar types of by-products or waste products for which there is presently no commercial demand. For example, the coal industry collects vast quantities of coal fines for which there is little present use. The coal is typically contained in a slurry with water, termed "black water" by the industry, which must be held in settling ponds to separate the coal fines from the water before the water can be discharged to the streams. Since this water is often highly acidic, it should be treated prior to its discharge and indeed the Environmental Protection Agency is presently concerned with the high acidity of such waste water. Like the coal industry, the forestry industry also has a significant quantity of by-products for which there is presently little or no commercial demand. Typical by-products are tree bark, sawdust and wood fibers, which are produced in the manufacture of wood products.

While at the present time there is little or no demand for waste products such as those described above and others of similar character, there is a presently existing need for a technique which allows one to revegetate the areas which have been strip mined in this country as well as for better techniques for reforesting those areas from which lumber has been harvested. At the present time it is very difficult to revegetate a strip mined area because most of the topsoil has been removed and the soil which remains is very hard and dense and does not provide a good growing surface for grasses or seedlings. Synthetic seed beds are useful in such difficult environments to provide a good start for seedlings and the like. As in the case of reclaimed strip mines, the site may be too firmly packed in the soil, too impervious for direct seeding, although plants once vigorously growing, will establish themselves in such soil. A synthetic seed bed may give the seedlings the required head start to flourish in such a hostile environment.

When seeds spout, the tiny rootlets are very vulnerable to damage from the hard soil or from a very hard rain. The microscopic root hairs of the rootlet must remain in contact with liquid water while at the same time having access to oxygen. The rootlets must have room for growth until they have grown strong enough to penetrate the firm soil while at the same time being protected from drying out or drowning or from physical dislodgement. Properly designed synthetic seed beds will provide the necessary environment.

Prior art techniques exist for overcoming some of the problems which are encountered in reseeding areas such as strip mines. However, none of the products presently available are capable of providing the necessary environment for guaranteeing vigorous plant growth while at the same time having the necessary physical attributes of protecting the growing plant from the vagaries of our environment.

With the oncoming of the energy crisis, the use of fireplaces and stoves to serve a functional as well as decorative purpose has gained wide spread acceptance. The renewed interest in the use of stoves and fireplaces has placed a strain on the supply of suitable fuels for these devices. In many of the metropolitan areas it is difficult to obtain aged wood to burn in these devices and the costs are quite often prohibitive, making the economics of using stoves and fireplaces as a supplemental heat source unattractive. While there is often a shortage of high quality fuel for such devices, the coal industry has significant quantities of coal dust for which there is presently little or no commercial market. It would obviously be desirable to convert this coal dust into a product which could be burned in a stove or fireplace to provide not only aesthetic appeal but also a supplemental heat source.

Accordingly, a need exists for a technique for converting the waste products and by-products of industry into useful commercial articles which fill existing needs.

SUMMARY OF THE INVENTION

It is an object of the present invention to provide a technique for converting waste products into useful products.

It is yet another object of the present invention to convert the slag obtained from ore or metal smelting and from the combustion of carbonaceous fuels into a useful product.

It is yet another object of the present invention to produce an article of commerce from waste cellulose fibers.

It is yet another object of the present invention to provide a useful article from slag and waste cellulose fibers.

It is yet another object of the present invention to provide an article comprising coal, slag and waste cellulose fibers.

These and other objects of the present invention have been accomplished by pulping pulpable fibers and mixing therewith a porous slag having an open pore structure. The resulting admixture may contain additional additives and be further processed to produce useful articles.

DETAILED DESCRIPTION OF THE PREFERRED EMBODIMENTS

The slag which is employed in the present invention may be obtained from the smelting of metal or iron ores or as a by-product of the combustion of carbonaceous fuels. The slag of the present invention must be porous and have an open pore structure. Such slags are the fused product which is formed by the action of a flux on the gangue of an ore, fuel or scrap metal such as is obtained in the refining of copper, aluminum, iron, magnesium, nickel ores as well as foundry slags, and from the combustion of fuels such as coal. Typical slags include blast furnace slag, open hearth slags, oxygen converter slags, oxygen furnace slags, slags from L.D. process, slags from the Q.B.O.P. process developed by United States Steel, Bessemer converter slags, cupola slags, electric furnace slags and the like as well as coal slags such as low melting ash which can be tapped from the boiler as a liquid. The only essential requirement of the slag is that it have an open pore structure.

Slags with closed pores, and materials like pearlite which also has closed pores will not work in the compositions of the present invention when they are the only source of the slag material. The open pores interact with the fibrous component, described hereafter, to provide an interlocking structure. The interlocking structure holds the fibers locked in position and provides the final products of the present invention with good structural integrity. The slags described previously may be produced with an open pore structure by simply quenching the molten slag with water. This quenching step is a conventional one in the art and may be accomplished by either dumping the molten slag into a pool of water or by passing the molten slag through a stream of water. These techniques are termed "pit granulation" and "jet granulation" respectively. These are the well-known granulation slags which are well-known to those skilled in this art. Generally, the open pore slag will have a density from about 72 to 81 lbs/ft.$^3$. The so-called "expanded" or "light-weight" slag prepared by quenching molten slag with steam cannot be used as the sole source of slag for the compositions of this invention since it has a closed pore structure and will not lock the fibers into place. However, expanded or light-weight slag can be used in combination with the granulated slag described previously.

The composition of the present invention comprises in addition to the slag, fibers. Essentially any pulpable fiber may be employed in the formation of the products of the present invention. From the viewpoint of cost and availability, it is preferred to employ waste fibers from various manufacturing processes such as paper fibers, nylon fibers, rayon fibers, bark fibers, wood fibers, glass fibers, asbestos fibers and the like. From the point of view of expense and availability cellulose fibers, in particular waste paper such as newsprint, are preferred.

The fibers are pulped in the conventional manner that fibers are pulped in the manufacture of paper products and the like. The fibers are simply admixed with an aqueous medium and agitated until the pulp is formed. It is not necessary to pulp individual fibers, fibers in sheet form may be pulped by simple addition to the aqueous medium and agitation. The fibrous content of the aqueous medium is not critical so long as the pulp can be handled in a convenient manner. Fiber contents in the pulp of from 1 to about 10 wt.% based on the total water and fiber may be used, fiber contents of about 2 to about 7 wt.% are preferred, more preferably fiber contents of from 3 to 5 wt.%.

The length of the fibers which are to be employed in the process is not critical since the fibers will be locked into place by the open pore structure of the slag. Those familar with the paper and cardboard industry will recognize that longer fibers will give a mechanically strong product than will the shorter fibers. Fiber lengths of from about 1/16th of an inch to in excess of ½ inch have been employed successfully in this process. Fibers of various lengths can be mixed together to form the pulp used in the present invention. For example, newsprint which has a fiber length of about 1/16 of an inch can be admixed with a wood fiber having a fiber length of ½ inch or longer. However, the use of the longer fibers is not essential to forming a stable product in the present invention since the slag locks the shorter fiber lengths in place to create an effect similar to that obtained by the intertwining of the long fibers normally employed to produce a high strength product.

The slag described previously is admixed with the pulp fiber to form the base composition of the present invention. The quantity of slag admixed with the pulp is not critical and may be chosen as desired. The weight ratio of slag to dry fiber weight can range from about 0.5 to 100:1, more preferably from 2 to 50:1, and most preferably from 5 to 20:1. However, greater or lesser quantities of slag may be employed if so desired.

The base composition which results from the admixing of the slag with the pulp may be employed as is as a mulch for agricultural use. The slag may be distributed on the ground by simply pouring, ladling or the like. However, it is preferable to spray the material on the ground using conventional spraying techniques, such as the Hydroseeding technique presently available. The pulpable mass containing the slag may be readily sprayed. When it is desired to spray the composition through a nozzle, it is desirable to screen out the larger slag sizes, i.e., those above about 1 millimeter. For the other applications, the slag particle size is not critical and typically ranges from 0.1 millimeter up to about 10 millimeters, typically averaging about 0.5 to 1 millimeter.

When the base composition is to be employed for agricultural uses, it will often be desirable to choose a slag having either an acidic or basic pH. In this manner, the base composition applied to soil will provide the soil with the desired pH. Many adjuvants can be added to the base composition depending upon the final use. When the base composition is to be employed in agricultural products, micronutrients, fertilizers, additives to alter the pH, pesticides, herbicides, insecticides, plant seeds and the like may be added. The composition may be employed in the wet state or it may be dried and employed in the dry state as the synthetic seed bed. The wet composition of the present invention can be processed in the same manner as pulps which are employed to produce cardboard, paper and the like to provide a solid sheet-like product which may be employed as the mulch or artificial seed bed. The artificial seed bed can be made very thin, ⅛th to ¼ inch, and subsequently coiled into a roll. This is the advantage of allowing one to transport only the dry material and not the water employed to form the pulp. Such rolls when they contain grass seeds and the like, may find wide spread application in revegetation of abandoned strip mine sites. The material is simply unrolled on the ground and subsequently watered. The composition provides an excellent plant growth medium which results in quite vigorous growth and ultimate establishment of the desired vegetation on the site. Because of the open porosity of the structure, the young seedlings are able to obtain both water and oxygen quite readily and thereby establish themselves. As the plants grow into maturity, the roots are able to break through the harder subsoil to ultimately form permanent vegetation on the site. Alternatively, the material can be fabricated into thicker sheets which will have somewhat more structural integrity. In order to minimize labor costs in reestablishing vegetation at a particular site, it may be desirable to simply employ the material in the wet state containing an admixure of pulp, slag, seeds and desired micronutrients and the like. The admixture is simply sprayed or poured onto the area to be revegetated. The thickness of the composition on the ground can be easily controlled by varying the rate of application. The thickness of the dried material on the area to be revegetated is not critical and may range from less than ⅛ inch up to over ½ inch.

The slag which is present in the present invention holds the fibrous material in place on the ground and prevents the seeds from being carried away in a heavy rain or windstorm. Tests to date have shown that if material other than slags having an open pore structure are employed, a heavy rain or windstorm will cause the material to be washed or carried away. It is necessary that the open pore slags of the present invention be employed in the composition if it is to be successfully employed.

The quantity of seed, micronutrients and fertilizer incorporated with the slag and fiber mixture for revegetation pruposes is not critical and may be readily determined by those skilled in the art. The only limitation is that the quantity of fertilizer not be so large as to "burn" the roots of the plant upon seed germination. Typically, for grass seed, the seed content of the admixture will be sufficient to provide from 25 to 100 pounds of seed per acre covered, more preferably from 40 to 80 pounds of seed per acre covered. The exact quantity of grass seed will of course depend upon the particular grass seed mixture employed. When revegetating it is possible to use a mixture of grass and tree seed, with a tree seed content sufficient to provide from about ⅛ to ¼ pound of seed per acre.

When using the composition of this invention to revegetate an acre by hydroseeding, it has been unexpectedly found that no separation of the seed from the admixture of pulped fiber and open pore slag occurs during the spraying even though the seeds, pulped fibers and slag all have different densities. As a result, it is possible to prepare a homogeneous seeded bed by a simple spraying procedure which greatly reduces labor costs.

It may be desirable for some applications to incorporate with the base composition, plant seeds and the like, fillers such as peat moss, hay, ground bark, and sawdust to increase the water absorptive capacity of the material.

The base compositions of the present invention can also be fabricated into a number of other very desirable products. In so doing, it is often desirable to include other materials in the base composition besides the slag and pulp. Such materials include carbonaceous materials including asphalt, coal, coal dust, sawdust, bark, ground bark, ground rubber, wax, and other fibers and fillers such as asbestos, vermiculite, pearlite, gypsum, pumice, cement, diatomaceous earth, glass fibers, and sand. By selecting a suitable additional compound, it is possible to fabricate the base composition into artifical logs which may be used as fuel for fireplaces and stoves, roofing shingles, flower pots, both biodegradable and non-biodegradable, fiber board, as a liquid roofing material and acoustical tile.

In producing a structure such as artificial logs, it is conventional to take the pulp and add thereto the slag and a suitable carbonaceous fuel. The resulting admixture is then compressed and dried. It is often advantageous to incorporate into this admixture a water soluble resin to bind the material together. Alternatively, it is possible to impregnate the material after drying with a suitable resin to hold the material together. One advantage to the present invention is that the binders which are employed may be either water soluble or insoluble rosins or resins, alcohol soluble rosins or resins, tar, pitch, and the like. It is preferred to employ as binders those rosins and resins which are by-products from the manufacture of naturally occuring and synthetic resins as well as rosins. The rosins suitable for use in the invention are characterized as resin acids of the abietic and pimaric types of the general formula $C_{19}H_{29}COOH$ and having a phenathiene nucleus. The rosins are derived from pine trees, chiefly Pinus palustris and Pinus caribaea, (a) gum rosin is the residue obtained after the distillation of turpentine oil from the oleoresin tapped from living trees; (b) wood rosin is obtained by extracting pine stumps with naphtha and distilling off the volatile fraction; (c) tall oil rosin is a by-product of the fractionation of tall oil (g.v.), and is finding increasing use. Grades: virgin; yellow dip; hard; N.F.Wood rosin in grades B, C, D, E, F, FF, G, H, I, J, K, L, M, N, W-G (window-glass), W-W (water-white). The grading is done by color, B being the darkest and W-W the lightest. It is preferred to use the darker colored rosins such as grade B because these rosins are comparatively inexpensive.

Suitable natural resins include vegetable-derived amorphous mixtures of carboxylic acids, essential oils, and terpenes occurring as exudations on the bark of many varieties of trees and shrubs. Most are soluble in alcohols, ethers and carbond disulfide, and insoluble in water. The most common of these are rosin and balsam, obtained from coniferosu trees. Particularly suitable binders are the "B" dark rosin size and the "B" wood rosin dissolved in 80% non-volatile hydrocarbon because of their ready availability and low cost.

If desired, metal salts may be incorporated into the artificial logs of the present invention to provide a flame having multiple colors. It may also be desirable to incorporate a wax or other material to improve the combustibility of the log. By selection of the appropriate quantities of a carbonaceous fuel such as coal, coal dust, wood chips and starting fluids, such as wax, one can provide logs having various BTU ratings; thereby making it possible to produce logs which are specifically adapted for use in freestanding fireplaces and other logs which are more suitable for use in stoves or fireplaces.

The binder and other material incorporated into the composition of the present invention will, of course, be chosen depending upon their final use. For example, when the material of the present invention is to be selected for agronomic uses, the materials should be compatible with such a use.

The quantity of adjuvants which may be employed can vary widely and will depend on the final use. For instance, the quantity of coal dust which may be incorporated into the log can range from 0 to 10 parts by weight per part by weight of slag and fiber material, more preferably from 4 to 5 parts by weight per parts by weight of slag and fiber material.

When concrete or cement is incorporated into the composition of the present invention a sturdy, cement-like product can be prepared using far less cement than otherwise would be required. For example, it is possible to make cement pots using the composition of the present invention in an admixture with a suitable amount of cement which may be readily ascertained by those skilled in the art. Similarly, cement drain pipe and the like may also be fabricated from the compositions of the present invention which includes cement or concrete.

The base composition of the present invention also possesses outstanding properties as a filter material, especially for the so-called "black water" which is obtained from coal mines as a result of the washing of coal dust out of the atmosphere. This black water contains coal dust having a particle size of less than 200 mesh. Filters made from the composition of the present invention are capable of filtering black water such that it is almost completely free of suspended coal dust. In using the compositions of the present invention to filter such black water it is possible to simply place the base composition, pulp and slag, onto a suitable substrate and then simply pass the black water through the filter or it is possible to have first prepared a dry filter by using standard paper manufacturing techniques from the base composition of this invention. The advantage to filtering the black water with the compositions of the present invention is that once the filter media is fully loaded with coal dust, the coal dust may be homogeneously mixed in with the filter material and subsequently briquetted to provide a fuel which may be burned in a stove, furnace, fireplace or the like. If desired, additional coal dust or other carbonaceous material may be incorporated into the mass before briquetting as well as any other additives which may be deemed desirable. In this manner, the coal dust may be recovered from the black water and formed into a saleable product with a minimum number of processing and handling steps.

The black water typically is very acidic because of the impurities which are dissolved out of the coal dust by the water. This highly acidic water creates a significant pollution problem even after it is freed of coal dust. If the slag chosen to form the filter material is very basic, (high in CaO content), it is possible to not only filter the coal dust from the water but also reduce the acidity of the water simultaneously. It is possible to also incorporate with the filter material of the present invention additional basic material such as sodium hydroxide or the like to further reduce the acidity of the water and to render it more nearly neutral.

Filters prepared from the composition of the present invention are capable of filtering far greater quantities of black water than are conventional filters now employed because of the open porous structure of the slag material. As a result of this structure, the filters of the present invention do not matt together and become clogged as quickly as do conventional filters.

Filters prepared from the base composition of this invention may be also employed to filter fluids such as those obtained from sewage treatment plants and the like. The porous nature of the slag material will result in a filter material which can filter greater volumes of material than those filters conventionally employed in the art. When the filters are employed in sewage treatment plants, the filter material can be recovered and employed as an artificial seed material after suitable sterilization. In this manner, the nutrients which are contained in the filtered sludge which have been trapped by the filter material can be used as a plant food supplement in the growing of seedlings, seeds and the like.

The compositions of the present invention can also be fabricated into material such as hardboard and acoustical tile in the same manner as these materials are presently manufactured. The advantage of the compositions of present invention is that shorter fiber length materials may be employed in the manufacture of hardboard and ceiling tile without imparing the physical strength of these materials. The interlocking action imparted by the open porous slag has the same effect as the interlocking of the longer fibers which are typically employed in the manufacture of these products. As a result, cheaper fiber sources could be employed in the manufacture of fiber board and acoustical tile than are presently employed.

The compositions of this invention can also be employed to great advantage in forestry. In the southeastern portion of the country it is typical to reforest our pine forest after harvesting through the use of pine seeds. The seeds are typically distributed across the ground in a regular pattern so as to provide good and adequate spacing between the seedlings after sprouting of the seeds. However, a hard rain or high wind will often disrupt the desired seed pattern resulting in bunches or clumping of the trees which provides uneven reforestization. It is possible using the compositions of the present invention to prepare individual pellets containing one or more pine tree seeds. These pellets which may range in size from $\frac{1}{2}$ inch to 1 inch in height and diameter are more resistant to movement caused by either heavy rains and runoff or by high winds. Alternatively, the seeds could be distributed in the mixture of pulp and slag and then sprayed across the area to be reforested using a device such as a Hydroseeder sold by the Finn Equipment Company. Whichever technique is chosen, the composition of the present invention can also incorporate micronutrients and fertilizers to provide for faster growth of the seedlings. In the Pacific northwest part of the country, reforestization of the Douglas pines is accomplished by planting the seed in a plastic cone shaped device known as a "dibble" and allowing the seed to sprout and growing the tree in this plastic dibble for a period of from two to three months. Once the seedling has reached the desired maturity, the seedling is then yanked from the dibble by simply grasping it and pulling it out. This procedure shocks the young seedling which results in the seedling going into a dormant stage for anywhere from several weeks to several months. During this dormant stage, no growth of the seedling occurs. Instead of employing the plastic dibble to hold the growing seedling and the growth medium, one simply forms the growth medium out of the composition of the present invention by incorporating suitable fertilizers, micronutrients, peat and the like into the mixture of pulp and slag and shaping this mixture and drying to the desired size and shape. The tree seed would then be inserted and the entire material wetted. Once the seedling has reached the desired maturity, the entire structure would simply be planted into the ground. In the preferred embodiment, the outside of the cone shaped structure prepared from the composition of this invention would be coated with a biodegradable resin to provide the necessary physical integrity to the structure. If desired, this structure could have been impregnated with a similar biodegradable resin. Once the seedling has reached the desired maturity, the entire structure is simply planted into the ground avoiding any shock to the growing seedling. This procedure not only avoids shock to the seedling but it also reduces the amount of labor which is required, the recovery and reuse of the plastic dibbles is not required.

The composition of the present invention can also be fabricated into seed sheets for lawns, trees, flowers, vegetable gardens and the like. In such applications the thickness of the sheet is not critical. Thicker sheets, such as those ⅜th inch to ½ inch in thickness will be self-supporting while the thinner sheets, preferably containing a biodegradable webbing, after drying can be taken up on rolls to facilitate handling and storing.

The composition of the present invention finds use not only in artificial fuel and in agronomic uses, but also can be used to manufacture roofing material such as roofing shingles and liquid roofing. Presently, asbestos fibers are employed in the manufacture of roofing shingles. Recently, it has become recognized that worker exposure to asbestos dust can present a significant health hazard. Accordingly, it would be desirable to manufacture roofing shingles from materials other than asbestos fibers. The composition of the present invention can be employed to manufacture roofing shinges by simply forming the composition of the present invention containing pulped fibers and slag into a sheet using known paper and paperboard manufacturing techniques and subsequently impregnating the material with asphalt. Alternatively, a water soluble tar could be incorporated in the mixture of slag and pulped fiber and then formed into a sheet and dried. In either technique the quantity of tar employed is essentially the same as that used in the preparation of conventional asbestos roofing shingles. The resulting material if needed can have aggregate distributed on the surface just as in the manufacture of roofing shingles today. The resulting roofing shingles will possess the same characteristics as a roofing shingle produced from asbestos. The slag of the present invention will hold and lock the various fibers into position to provide a strong roofing shingle in the same manner as the intertwining of the asbestos fibers does for the present day roofing shingle.

Liquid roofing material could be produced by taking the pulped fibers and aggregate of the present invention, drying and then incorporating into the dried material tar at an elevated temperature and subsequently cooling. Alternatively, a water soluble tar could be added to the admixture of slag. At the time it was desired to apply it to the roof, one would simply melt the tar and apply the material just as is done with conventional liquid roofing materials today. The presence of slag and fibers would offer additional integrity to the material especially upon its exposure to the hot sun and eliminate the need for felt paper.

The materials of the present invention will also find use as synthetic topsoil material, as to prevent soil erosion and as a mulch. By selection of an organic and biodegradable fiber, one has all of the necessary ingredients for an excellent topsoil, the slag will provide the porosity necessary for the soil while the organic fibers will provide the necessary nutrients and environment for the growing plants. The material has the necessary structural integrity to control soil erosion until vegetation has a chance to become established on a particular surface. Florists will find the composition of the present invention in dried form to be quite useful in plant and floral arrangements. The material has a high moisture absorbence capacity which can keep cut flowers and plants looking fresh far longer than conventional materials.

Having generally this invention, a further understanding can be obtained by reference to certain specific examples which are provided herein for purposes of illustration only and are not intended to be limiting unless otherwise specified.

EXAMPLES

Example 1

The following composition was prepared:

| | | |
|---|---|---|
| Pulp | 50 gallons | 200 liters |
| Granular Slag | 50 gallons | 200 liters |
| 8/8/8 Fertilizer | 6 gallons | 25 liters |
| Bermuda Grass Seed | 6 ounces | 150 grams |

Pads are formed of this mixture by pouring the mixture into a shallow box, the bottom of which is a screen. The loaded box is placed upon a vacuum source which drains water out of the mixture leaving the pad behind. In another embodiment, pressure is applied to the surface of the mixture in the box, forcing excess water through the screen. Methods of making pads of fiber from a slurry of fiber are well known to those skilled in the paper-making arts. The pads are made of a length and breadth convenient for further handling, and between ¼ inch (7 cm) and ¾ inch (20 cm) thick.

The pads are air dried at a temperature which will not kill the seeds in the mixture, but which will dry the pads before the seeds begin to germinate. The temperature and conditions of drying vary according to the characteristics of the seeds in the mixture and the porosity of the pad. With Bermuda grass and the preferred components recited, a temperature of 125° F. (51° C.) was used.

The pads may be stored for at least a year in a dark, dry environment. In use, the pads are set in place upon a soil substrate, and the pads are wet down. The pads should be kept damp until germination is well underway; a thorough wetting once a day, when daytime temperature is as high as 100° F. (38° C.), suffices. Germination of Bermuda grass starts in four to six days.

Example 2

The mixture described in Example 1 is applied as a slurry directly to the soil substrate in a layer averaging about ¼ inch (7 cm) to ¾ (20 mm) deep. The mixture, being of pasty consistency, will adhere surprisingly well even to sloping surfaces. As with the embodiment using dried pads, the mixture should be kept damp until seedlings are well established.

Example 3

Sections of grass roots and nodes are employed. This technique is useful when planting grasses such as Zoysia and Centipede genera, which do not satisfactorily reproduce from seeds. In this embodiment, a mixture is made up of:

| | |
|---|---|
| Pulped Wastepaper Slurry | 75 gallons |
| Granulated Basic Slag | 25 gallons |
| 15-0-15 Fertilizer | 3 gallons |
| 8-8-3 Fertilizer | 3 gallons |

The roots of a plot of Zoysia about 25 square feet (2.3 m$^2$) in area are chopped into sprigs between ½ inch and 1 inch long, and are added to this mixture. The mixture is made into pads about ¼ inch (7 cm) thick by the method already recited. Pads from this formula will provide ground cover for about 700 square feet (18 m$^2$) within about 60 days of good growing weather. This amounts to multiplying Zoysia coverage by a factor of 25 or more.

Example 4

A mixture is made according to the formula:

| | |
|---|---|
| Pulped Waste Paper Slurry | 50 gallons |
| Granulated Basic Slag | 50 gallons |
| 15-0-15 Fertilizer | 6 gallons |

The mixture is extruded and cut into cylinders two inches (5 cm) in diameter and two inches long. A small hole is formed in one face of each cylinder and they are dried. The sides and bottoms of the cylinders, but not the tops in which the hole is punched, are coated with a biodegradable resin to enhance integrity of the structure for handling. A satisfactory resin for this purpose is a urea-formaldehyde resin.

A tree seed is planted in the hole according to methods well known to horticulturists, and the cylinder is kept damp to cause germination and seedling growth. The composition cylinders, with the seedlings, are then planted at the intended growth site. They are sufficiently rigid and uniform to lend themselves readily to automatic transplanting machines.

EXAMPLE 5

A mixture is made according to the formula:

| | |
|---|---|
| Pulped Wastepaper Slurry | 75 gallons (300 l.) |
| Granulated Slag | 25 gallons (100 l.) |
| Coal Dust | 50 gallons (200 l.) |

The mixture is extruded and cut into log-shaped briquettes of a size convenient for burning in a fireplace.

A briquette made of this material about four inches long in diameter and two feet long will burn for several hours. The porous nature of the briquette provides controlled oxygen access to the coal particles and the fibers, so that they burn slowly but completely. The slag particles become incandescent as the briquette burns, and radiates heat which, without the incandescence, would be carried up the chimney. Thus, the briquette provides an excellent source of clean, radiant, smokeless, heat.

The terms Acidic, neutral and basic slags refers to the ratio of lime to silica (CaO:SiO$_2$) in the slag. A very basic slag is typically characterized by a 4:1 time to silica ratio, a basic slag by a 2:1 ratio and an acid slag generally by a 1:1 ratio.

The following Table contains an analysis of various slags ranging from very basic to very acid.

TABLE

SLAG ANALYSIS - VERY BASIC TO ACID

| | | SiO$_2$ % | Al$_2$O$_3$ % | CaO % | MgO % | FeO % | MnO % | CaO+ MgO | SiO$_2$+ Al$_2$O$_3$ | Ratio | S in Slag |
|---|---|---|---|---|---|---|---|---|---|---|---|
| A | Very basic - very reducing (.008% S in melt) Disintegrates-white powder | 16.1 | 3.45 | 62.4 | 8.1 | .28 | Trace | 70.5 | 19.6 | 3.6/1 | .90 |
| B | Very basic - reducing (.008% S in melt) Disintegrating slag-gray | 19.7 | 3.2 | 61.45 | 7.1 | .27 | .06 | 68.6 | 22.9 | 3.0/1 | 1.02 |
| C | Basic - oxidizing (.021% S in melt) Sandy powder | 26.0 | 3.9 | 65.4 | 2.2 | .33 | .30 | 67.6 | 29.8 | 2.3/1 | .90 |
| D | Basic - oxidizing I (.03% S in melt) II I Dark to II Light ac/R$_2$O$_3$ | 30.5 28.7 | 3.9 6.9 | 46.9 47.9 | 14.3 12.7 | 1.44 1.73 | .36 .35 | 61.2 60.6 | 34.4 35.6 | 1.8/1 1.7/1 | .48 |
| E | Basic - oxidizing (.04% S in melt) Dull sandy color | 29.3 | 9.5 | 55.4 | 2.2 | .32 | 1.38 | 57.6 | 38.8 | 1.5/1 | — |
| F | Neutral (.05/.07% S in melt) | 33.6 | 13.1 | 34.6 | 12.4 | 1.5 | 2.7 | 47.0 | 46.7 | 1.0/1 | 1.00 |
| G | Acid - typical (.09/.10% S in melt) Glassy | 46.2 | 11.0 | 37.2 | 1.4 | 1.1 | 1.4 | 38.6 | 57.2 | .7/1 | — |

TABLE-continued

| | | SLAG ANALYSIS - VERY BASIC TO ACID | | | | | | | | |
|---|---|---|---|---|---|---|---|---|---|---|
| | | $SiO_2$ % | $Al_2O_3$ % | CaO % | MgO % | FeO % | MnO % | CaO+ MgO | $SiO_2$+ $Al_2O_3$ | Ratio | S in Slag |
| H | Acid - oxidizing (.09/.12% S in melt) Viscous and black | 47.1 | 12.1 | 22.0 | 1.6 | 6.9 | 4.6 | 23.6 | 59.2 | .4/1 | — |

A major use of these compositions is for ground cover generation where the composition will serve as the top soil. A minimum of subsoil preparation is needed, and would consist largely of returning the soil to the desired contour before application of this novel ground cover.

The basic recyclable materials in the ground cover would be supplemented with other materials, such as old saw dust, ground pine bark, fertilizer (either artificial or natural, such as sterilized sewage sludge), and suitable trace elements. To this mixture would be added the growth material, such as grass, shrub or tree seeds, seedlings, or root sprigs.

These materials are formed into a very porous type of ground cover, which allows the fertilizer to soak into the ground for a fast start of plant growth. The fiber pulp-slag matrix serves as a barrier to retain moisture in the soil at the bottom of the seed bed, while keeping excesses of water from eroding the soil.

The basis materials would also provide a source of trace elements beneficial to growth of grasses, etc. The granulated slag would prevent the matting of the paper fibers. It provides for oxygenation and moisture retention for rapid seed germination and plant growth. The slag is retained in the paper pulp by both adhesion and mechanical entanglement of the fibers in the porous structure of the slag particles. The fiber adhesion to the slag particles results from the coating of the fibers and slag particles during drying or evaporation, with materials dissolved in the water of the wet pulp. This enables the coated materials to retain fertilizers and seed for rapid germination and growth.

Adjuvants to be Used With Fiber Pulp and Slag a. Fertilizer

The use of paper pulp enables fertilizer to be dissolved in the pulping solution. The amounts and composition of the fertilizer would be influenced by the needs of the seeds or plants. The fertilizer could be either natural or artificial in origin, and would be mixed into the pulp (paper and slag). Source of natural fertilizer would be sterilized sludge recovered from municipal sewage plants. Artificial fertilizers would be the ammonium nitrate, potash, phosphates and the like manufactured for agricultural purposes.

b. Seeds

Seed of various grasses, trees, shrubs, etc. could be incorporated into the pulp. For lawns, grass seeds such as bermuda centipede, pennington green, Kentucky blue grass, etc., could be used. The selection would depend upon application and climatic conditions of different regions of the country. For general land reclaimation, other grasses, such as bahia, coastal bermuda, sericea lespedsa would be incorporated into the pulp. In addition, tree seed (such as pine) could be incorporated into the pulp, as could be a variety of flower or vegetable seeds.

c. Trace Elements

While trace elements such as boron, molybdenum, etc., may be available in the slag particles, and be slowly leached into the soil, these and other elements may be added to the slurry mixture as needed to supplement plant growth.

There are two ways to apply the mixture to the ground:

First, by making a mixture of these materials into a slurry and pumping it out onto the ground. In one operation the pulp-slag equivalent of top soil is formed with fertilizer and seed (or other growth materials) on the ground ready to germinate by wetting.

Second, by preparing a mix of these materials and forming on a machine a ground cover sheet ¼ inch to ½ inch thick. The sheet is then dried at a temperature that will not injure the seed or growth material. In this way the sheet may be shipped when it is needed, put it on the ground and wet the material to obtain germination. The very porous nature of the sheet material allows it to soak up and hold water and the wet sheet assumes the conformation of the ground; after the sheet becomes saturated with water, the excess runs off. The natural bond of the materials in the sheet to each other provides the wet strength needed for good soil erosion prevention. Soil tests of the ground to be covered will provide information on any nutrient deficiencies that need to be corrected. Appropriate elements can be then added to the slurry to get best results from the planting.

Dried sheet material has been tested by putting them on the ground in pad form at different times to see effects on germination. The results of these experiments were favorable: all pads germinated within four to six days after wetting.

Dry pads out in April of 1977 which had been dried in June of 1976 also showed very good germination with seed coming up in four to six days, as was the case in the previous pad experiments. This demonstrates that the product has excellent shelf life.

Example 6

In preparing pads for these and other experiments, we mixed paper to a pulp consistency of 4 to 5% by volume, and combined this pulp with a slag in different ratios as follows to provide the base materials for supplemental additives:

1 part slag to 1 part paper
1 part slag to 2 parts paper
1 part slag to 3 parts paper
1 part slag to 4 parts paper.

In a test run there was used 2 gallons slag, 2 gallons paper, ½ pint 8-8-8 fertilizer and 2 teaspoons of bermuda grass seed. From this, there 1 ft.×1 ft.×¾ inch pads were prepared, and the balance of the mix spread on the ground to cover an area of about five square feet. The top of this mix was then rolled with a pipe to flatten the mix to the ground contour. Two of the three pads were placed inside a shed to dry, while the third pad was placed on the ground and wet down. Four days later, seed germination in both the spread mix and in the wet pad was observed. Fifteen days after preparation a pad was put out on the ground and wet; forty days after preparation the remaining dried pat was put out and wet. In both instances germination was found in four days.

These base materials (slag and fiber pulp) have been mixed in different formulations and have been applied to steep banks by throwing the materials on by hand. It has been found that the mix will stick to ground. It will not wash off by wetting either with water sprayed from hose or by rain. This material holds moisture very well and it is necessary to wet the slag-paper grass sod only one or two times a day during summer to keep it wet enough to obtain excellent grass cover results.

Example 7

Tests run with Zoysia grass sprigs:

A 1 ft.×1 ft. block of grass was chopped up into sprigs ½ inch to 1 inch long and mixed base materials:

3 parts paper in gallons
1 part slag in gallons
½ pint 15-0-15 fertilizer
½ pint 8-8-8 fertilizer This mixture was placed on the ground in pads of 36 inches×48 inches, a ratio of 12-materials to 1-grass in surface area. Similar run tests in this way up to a ratio of 25 to 1 in surface area.

Results of these tests show that in 60 days there is complete coverage of this slow growing grass.

Tests with different materials such as old sawdust and slag from a cast iron foundry process, bark, and old hay added to the base materials demonstrate that almost any inert material may be used to supplement the base materials, the porous, open pore slag and pulpable fibers. Also, for the necessary nutrients to grow any plants or trees, materials such as peat moss, pearlite and good humus top soil may be added to mixtures of basic materials in making solid cubes in which to plant vegetable seed for starter pots for subsequent transfer into ground at planting season. Pine tree seedlings have been set out in this type of container, because of the bonding effect of the base materials, these containers can be handled without damage to the container and transplanted. It is also very easy to control the pH factor for different varieties of plants and tree growth using these containers. The seed beds may have one or more of the following characteristics:

1. Prescribed and indented pads of the paper-slag base mixture used for seed beds.
2. The pads are punched to provide an indented area of appropriate depth to accommodate seed or seedling to be planted.
3. The pads are scribed both longitudinally and transversely in order to allow the easy separation of the seed (or plant) containing blocks for subsequent use.
4. The pads may be planted in whole sheet or pad form, or they may be broken and the blocks planted separately.
5. The composition of the biodegradable pad or blocks would be the paper-slag base supplemented with appropriate additives to provide the desired optimum seed or seedling environment. The additives would include plant nutrients and controlled pH custom-tailored to the needs of the seed or seedling used.

Because of the porosity of this material it is possible to make a pot in which to grow flowers that is porous enough to aerate the soil to a much better degree than possible with a clay pot.

By adding resin to basic material and curing it, any shape that will release from molds can be made. Also, containers can be made by adding cement to the base materials while using vacuum and pressure to obtain the desired shape. Coloring can be added to the materials as products are being made, or after the products are formed. Dipping, spraying or hand painting can be used to enhance the beauty of the product.

Using a vacuum pump to pull slurry of a mixture of basic materials to molds made in different designs, then drying at 300° F. to 340° F., and slipping in plyophen resin allows thorough impregnation of the containers. Then the containers are cured at 280° F. to 310° F. The containers have excellent color and water resistance but are very porous.

These containers have been tested in field experiments for two years. The plants that have been planted in them do very well compared to other containers now available. These containers have done very well under all weather conditions.

The material can be used by a florist to arrange flowers in any container. By adding water soluble glue or resin you can put this material in or on a container of any form. For arranging flowers, the density of the material can be controlled by an amount of water added as pressure is applied, and the material can be applied by hand. This is an improvement over the form block type materials now used in flower arranging, because the material will conform to the inside of any container. It can be hand molded to any shape for use on a flat plate or other object desired. The material can also be formed into a block or other design with pre-punch holes for flowers. In this way, one has a container and holder for flowers all in one item. By adding cement or plaster of paris one can make a container with more weight which will not blow over in applications outside the home.

Example 8

Although the base material holds water well, it also can serve as a good filter. Even under static head of only a foot or two, water will flow through. Tests with muddy water in a 4 inch standard pipe were made by putting 2 inches to 3 inches of the base material in the pipe and pressing the material down. Muddy water was then poured into the pipe, with the water flowing through the material showing a very good filtering effect.

Example 9

Filtering results:

1. Using a disk-type filter with an area of 51.84 sq. inch, a flow of 6 gpm was obtained at 40 lbs. pressure. This is with disk 6 inch I.D., 2-and-¾ inch deep with ⅝ inch wall thickness.

2. Using a block type filter with measurments of 2-and-¾ inch sq. by 5 inches long, a flow of 1-and-¼ gpm was obtained at 40 lbs. pressure.

With the base slag-paper mixture the freeness of the material can be controlled by the type of paper used. The freeness of pulp is greater with coarse or long fiber paper, and is less with fine or short fiber pulp. Freeness is also affected by the amount of pressure applied in making the filer. The ratio of the amount of paper to slag would be a method of control of flow or filtering ability of materials. These materials can be combined in many ways for filtration applications:

1. The loose materials can be used in a bed or a container.

2. Resins can be used to coat the materials and still have filtering ability as a result of the porosity of the materials.
3. The filter can be produced in a sheet or any desired form needed for special filtering application.

Areas of application for these filter materials are:
1. Swimming pool filters.
2. Plant effluents
3. Water purification plants and/or small filtration systems
4. Air filters
5. Rotor type filters, where screens are now used, could be made easy to apply.

With the use of the base materials it is possible to use other materials such as sand, gravel, or anything which would add to the porosity of the material if needed in special filtering applications. The sand will not bond to the paper-slag mixture, but it will become entrapped in these materials so as to add to the filtering ability.

Large amounts of ground rubber waste from tire recapping plants and tire manufacturing plants may be recycled by the use of the present invention. The waste rubber may be added to the base pulp-slag composition along with a suitable binder such as latex. The rubber will not bond but becomes entrapped in the base materials so that it can be pressed or extruded to any desired shape. Experimental plugs have been prepared from the rubber from a recapping plant using latex as a binder. It shows very good bonding effect. This can be made in a soft type or hard, according to pressure or the percentages of the base material and rubber waste.

It is also possible that the base paper pulp-slag material can be used as a filler in the manufacturing of rubber products now being made. This use could reduce the cost of present materials used and could save a good amount of energy. Other uses of the rubber-filled materials include:
1. In sheet form for subflooring.
2. Ditch lining for irrigation or to control erosion areas.
3. Skid-free matting for slippery floor areas:
    a. Aircraft carriers and ship-board applications
    b. Industrial use such as stairs and floors
    c. Application by painting a latex-pulp-slag mixture
    d. Application by tape strips
4. Road or highway surfaces, where the use of these materials should slowroad cracking caused by overloading or by deterioration because of freezing and thawing.

The porous slag-paper pulp mixture can be used for insulation in homes or commercial buildings, by mixing the base materials with resins the mixture will bond to most any surface. Such compositions have been prepared by mixing different resins and putting the mixture on vertical walls in different thicknesses and also as insulation around encased aluminum windows before a house is to be bricked, and the materials have been found to bond well to both wallboard and windows, sealing out cracks.

Foam fiber can be prepared by mixing the porous slag-pulp mixture of this invention with a two component methane foam mix. Good distribution of both materials in expanded form was obtained. This can be fabricated into foam fiber board using any other shape using the basic materials.

The materials themselves help to stop soil erosion. In areas of bad erosion, cement can be mixed with this material and put in ditches. Even though the material mixed with cement does not have the hardness of concrete, it sticks to the ground and holds up under all weather conditions. Winters with hard freezes seems not to effect these materials. It is possible to pump and spray the mixture of base material and cement on the ground to stop soil erosion. In fact, containers formed out of the base material and cement have withstood all weather conditions for 18 months. They show no sign of deterioration of any kind. The mixture of cement and base material can also be used to make a light weight brick or siding for construction use.

The thixatropic character provided by the fiber and slag bonded with cement enables the removal of forms immediately after pouring the mixture under vacuum or pressure conditions. Also, pipe can be made with this combination of materials for special applications, such as for filtering operations.

The base materials (slag and fiber pulp) plus asphalts as a binder and sealer will make roofing materials with enhanced fire retardation characteristics. The manufacturing involves the paper pulp mixed with slag and asphalt. This mixture can be formed through pressure rolls and sized for shingles for roofing; the material can also be extruded then sized for shingles. The material can be applied with brush, mop or brook from a container. The material can be sprayed directly to roofs without the use of felt layers now used. The base material in a wet state can be mixed in a water soluble asphalt. Water insoluble asphalt can be mixed with the base material with the fibers being in a dry state.

Having now fully described the invention, it will be apparent to one of ordinary skill in the art that many changes and modifications can be made thereto without departing from the spirit or scope of the invention set forth herein.

What is claimed as new and intended to be covered by Letters Patent is:

1. A composition comprising an interlocking admixture of pulped fibers and a slag characterized by an open pore structure.
2. The composition of claim 1, wherein the pulped fibers are cellulose fibers.
3. The composition of claim 1, wherein the pulped fibers are pulped waster paper fibers.
4. The composition of claim 1, wherein the slag characterized by open pores is obtained by quenching molten slag in water.
5. The composition of claim 1, wherein said admixture contains plant seeds.
6. The composition of claim 1, wherein said admixture contains plant seeds and plant fertilizer.
7. A composition comprising an admixture of fiber and an open pore slag characterized by the interlocking of said fibers and said open pore slag.
8. The composition of claim 7, wherein said admixture comprises from about 0.5 to 100 wt. parts of open pore slag per weight part of fiber.
9. The composition of claim 7, wherein said admixture comprises from about 2 to about 50 weight parts of open pore slag per weight part of fiber.
10. The composition of claim 7, wherein said admixture contains at least one plant seed.
11. The composition of claim 7, wherein said admixture contains at least one plant seed and plant fertilizer.
12. The composition of claim 7, wherein said admixture contains at least one member selected from the group consisting of asphalt, coal, coal dust, sawdust, bark, ground bark, ground rubber, rosin, resin and wax.

13. The composition of claims 7 or 12, wherein said admixture contains at least one member selected from the group consisting of asbestos, vermiculite, pearlite, gypsum, pumice, cement, diatomaceous earth, glass fibers and sand.

14. The composition of claim 1, wherein said admixture contains at least one member selected from the group consisting of sand and cement.

15. A process for preparing the composition of claim 7, which comprises pulping a pulpable fiber, admixing with the pulped fiber an open pore slag and then drying said admixture.

16. A method of controlling soil erosion which comprises applying to the soil the composition of claim 1.

17. A method of planting which comprises applying the composition of claim 5 to soil.

18. A fuel comprising an admixture of fiber, open pore slag and at least one member selected from the group consisting of coal, coal dust and wood chips characterized by the interlocking of said fibers and said open pore slag.

19. The fuel of claim 18, wherein said admixture contains a wax.

20. The fuel of claims 18 or 19, wherein said admixture contains a resin or rosin.

21. The fuel of claims 18, 19 or 20, wherein said admixture contains metal salts to impart color to the flame produced upon combustion of said fuel.

22. A composition comprising an admixture of plant fertilizer, fiber and open pore slag characterize by the interlocking of said fiber and said open pore slag.

* * * * *